United States Patent [19]

Swetnam et al.

[11] Patent Number: 4,470,242
[45] Date of Patent: * Sep. 11, 1984

[54] TWO ROW CROP HARVESTER

[75] Inventors: Larry D. Swetnam; James H. Casada; Linus R. Walton, all of Lexington, Ky.

[73] Assignee: The University of Kentucky Research Foundation, Lexington, Ky.

[*] Notice: The portion of the term of this patent subsequent to Jan. 11, 2000 has been disclaimed.

[21] Appl. No.: 408,232

[22] Filed: Aug. 16, 1982

Related U.S. Application Data

[63] Continuation-in-part of Ser. No. 252,315, Apr. 9, 1981, Pat. No. 4,367,621.

[51] Int. Cl.³ .................. A01D 45/16; A01D 55/00; A01D 91/04
[52] U.S. Cl. ............................ 56/10.2; 56/27.5; 56/121.41
[58] Field of Search .............. 56/10.2, 11.8, 11.5, 56/121.41, 27.5, DIG. 22, 11.9, 15.8, DIG. 15

[56] References Cited

U.S. PATENT DOCUMENTS

| 1,845,276 | 2/1932 | Huffman | 56/106 |
| 2,737,770 | 3/1956 | Wigham | 56/98 |
| 2,813,390 | 11/1957 | Irvine | 56/29.5 |
| 2,862,343 | 12/1958 | Wood | 56/DIG. 22 |
| 2,862,345 | 12/1958 | Wigham | 56/119 |
| 2,888,778 | 6/1959 | Cartier | 46/213 |
| 2,949,004 | 8/1960 | Jones | 56/DIG. 22 |
| 3,077,063 | 2/1963 | Samways et al. | 56/DIG. 22 |
| 3,174,266 | 3/1965 | Hoeksema | 56/106 |
| 3,283,486 | 11/1966 | Marek et al. | 56/DIG. 22 |
| 3,335,553 | 8/1967 | Medd | 56/14.6 |
| 3,706,186 | 12/1972 | Hurlburt et al. | 56/15.8 |
| 3,717,952 | 2/1973 | Strongin | 46/213 |
| 4,126,560 | 12/1979 | Clarke | 56/11.1 |
| 4,195,860 | 4/1980 | Helams | 56/15.5 |
| 4,197,690 | 4/1980 | Eistert et al. | 56/10.2 |
| 4,216,642 | 8/1980 | Spratt et al. | 56/27.5 |
| 4,295,323 | 10/1981 | Maier et al. | 56/10.2 |
| 4,367,621 | 1/1983 | Swetnam et al. | 56/10.2 |

FOREIGN PATENT DOCUMENTS

| 1407734 | 10/1968 | Fed. Rep. of Germany | 56/10.2 |
| 2354971 | 5/1974 | Fed. Rep. of Germany | 56/10.2 |

Primary Examiner—Paul J. Hirsch
Attorney, Agent, or Firm—Birch, Stewart, Kolasch & Birch

[57] ABSTRACT

A two row harvesting aid including an easily adjustable, semi-floating, self-steering primary cutter head and an auxiliary second row attachment for harvesting row crops. Self-steering capabilities, a cut-off mechanism and a quick-adjustment are combined into a single integral unit on the primary harvester. Direction sensing is accomplished by utilizing a feeler arm or a set of feeler arms which follow the plant stock row or other protrusions or indentations. Forces detected by the guidance sensors are transmitted to a ring which is a part of the housing and/or shielding of the cut-off device. The steering forces may be transmitted to a steering system through a single connection. The auxiliary second row attachment includes a motor operatively connected to an auxiliary cutter head for simultaneously harvesting an adjacent row of crops.

21 Claims, 7 Drawing Figures

TWO ROW CROP HARVESTER

CROSS-REFERENCE TO RELATED APPLICATIONS

This application is a continuation-in-part of copending application Ser. No. 252,315 filed Apr. 9, 1981.

BACKGROUND OF THE INVENTION

1. Field of the Invention

The present invention is directed to a two row crop harvester wherein a main adjustable semi-floating, self-steering cutter head and an auxiliary cutter head are utilized together to simultaneously harvest two rows of crops.

2. Description of the Prior Art

A number of harvesting machines have been developed wherein a cutter mechanism is used in conjunction with a self-steering device. A conventional self-steering device incorporates sensors disposed adjacent to an outside portion of the agricultural equipment to sense the presence of an article being severed. Examples of such prior art self-steering mechanisms are disclosed by Brooks, U.S. Pat. No. 3,430,723; Chapman, U.S. Pat. No. 3,780,507; Stubbe, U.S. Pat. No. 3,797,208; Stamper et al, U.S. Pat. No. 3,952,828; Gail, U.S. Pat. No. 4,126,984; Coenenberg et al U.S. Pat. No. 4,166,349; and Eistert et al, U.S. Pat. No. 4,197,690. In addition, the Sallee patent, U.S. Pat. No. 3,088,264, discloses an automatic header control means wherein feelers 50 extend downwardly into contact with the subjacent ground. Similarly, the Matthews patent, U.S. Pat. No. 2,972,847, discloses an automatic positioning means wherein plant lifters 22 and 23 are disposed adjacent to a row of crops to be processed.

A number of devices have been developed for harvesting row crops. For example, the Meyer patent, U.S. Pat. No. 3,249,366, discloses an automatic steering mechanism which includes guard members 70 and 72. The guard members are positioned adjacent to cutters 60 and 62. The frame member 64 is suspended from a rod 74 attached to a spring 76. The cutter assembly disclosed by Meyer is designed to work in combination with a conveyor or elevator 31.

The Spratt et al patent, U.S. Pat. No. 4,216,642, discloses a tobacco harvesting machine wherein a cutter 36 is utilized to sever a row of tobacco crops. An individual standing on the platform 28 grabs the severed tobacco stock and positions it on the stake 80. Thereafter, the stake 80 is raised and disposed on the deck 88 for temporary storage until the severed tobacco stocks are deposited onto the ground surface.

SUMMARY AND OBJECTS OF THE INVENTION

It is an object of the present invention to provide a two row crop harvester including an easily adjustable, semi-floating, self-steering cutter head disposed as a single integral unit in combination with an auxiliary cutter head.

Another object of the present invention is to provide a harvesting machine wherein the operators are seated in comfortable positions where they can conveniently harvest the row crops.

A further object of the present invention is to provide a feeler arm or a set of feeler arms for each cutter head being designed to follow the plant stock row or other protrusions or indentations, the feeler arm or set of feeler arms being adjustably movable in a vertical direction.

A further object of the present invention is to provide a harvesting machine which is relatively simple, reduces the cost of manufacturing and enhances the mechanical reliability.

These and other objects of the present invention are accomplished by providing a two row harvesting aid wherein an easily adjustable, semi-floating, self-steering cutter head for row crops is disposed adjacent to the forward portion of the harvesting aid. An auxiliary cutter head is disposed adjacent to and offset to one side of the self-steering cutter. The harvesting aid includes chairs in which operators may be conveniently positioned in close proximity to the cutter heads. After a primary operator steers the harvesting aid onto two rows of crops, the self-steering cutter head guides the machine along a primary row thereby severing individual crops from the primary row as the auxiliary cutter head severs individual crops from an adjacent row. The severed crops are grasped by the operators and positioned on upwardly projecting sticks disposed adjacent to each operator. After a predetermined number of crops are disposed on the sticks, the operators, individually, dislodge the sticks from the harvesting aid thereby positioning them on the ground surface. Thereafter, the operators position another stick in the stick support and proceed to continue harvesting the crops.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
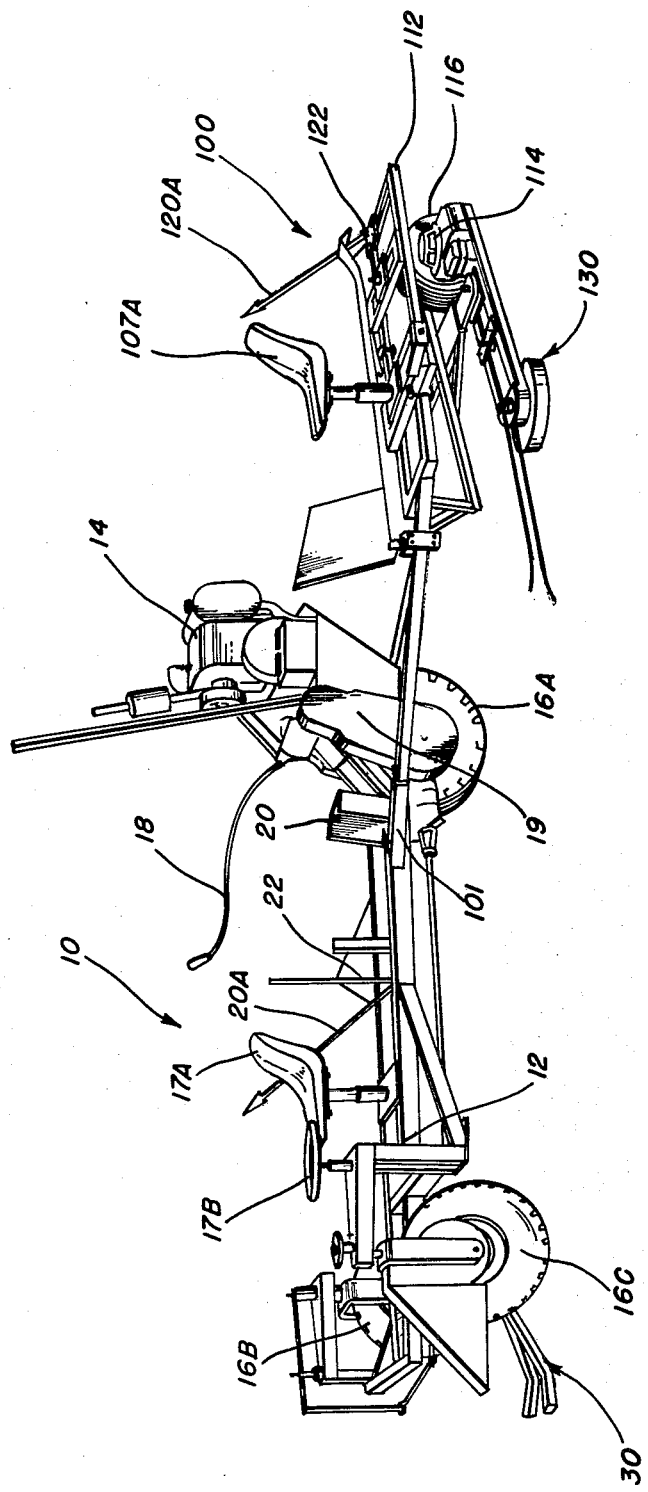
FIG. 1 is a side perspective view illustrating the two row harvesting aid according to the present invention.

As illustrated in FIG. 1, the present invention is directed to a harvesting aid 10 which includes a support frame 12 mounted on at least three wheels 16A, 16B, and 16C. The rear wheel 16A is operatively connected to a motor 14 by means of a chain drive 19. A control rod 18 is utilized to control the speed of the motor 14 and the forward movement of the harvesting aid 10.

An operator's seat 17A is positioned on the support frame 12 adjacent to the forward end thereof. Positioned in close proximity to the operator's seat 17A is a steering wheel 17B which may be utilized by the primary operator to initially steer the harvesting aid 10 onto a row of crops. After the harvesting aid 10 is positioned to be parallel with a row of crops, the steering of the harvesting aid is controlled by the self-steering cutter 30. The harvesting aid 10 may be incrementally advanced along the row by means of an automatic speed control device, not illustrated, disposed on the motor 14. In addition, the operator may control the forward speed of the harvesting aid 10 by means of the control rod 18.

As illustrated in FIG. 1, a stick support 22 is disposed adjacent to one side of the support frame 12 and a stick storage rack 20 is positioned in close proximity to the operator's seat 17A. In this manner, an operator may readily grasp a stick 20A and position it in the stick support 22 so that crops which are to be harvested may be impaled thereon.

An auxiliary second row attachment 100 is removably affixed to one side of the support frame 12 by means of a towing ball and socket 101. An operator's seat 117A is positioned in close proximity to an auxiliary cutter head 130. Stick support 122 is disposed at one side of the auxiliary second row attachment 100 into which a stick 120A may be positioned. In this manner, an individual positioned on the operator's seat 117A may readily impale the stock portion of a harvested crop onto the stick 120A.

The auxiliary second row attachment 100 is mounted on a support wheel 116 for movement together with the harvesting aid 10. A motor 114 is positioned on the auxiliary support frame 112 and is operatively connected to the auxiliary cutter head 130.

Figure 2:
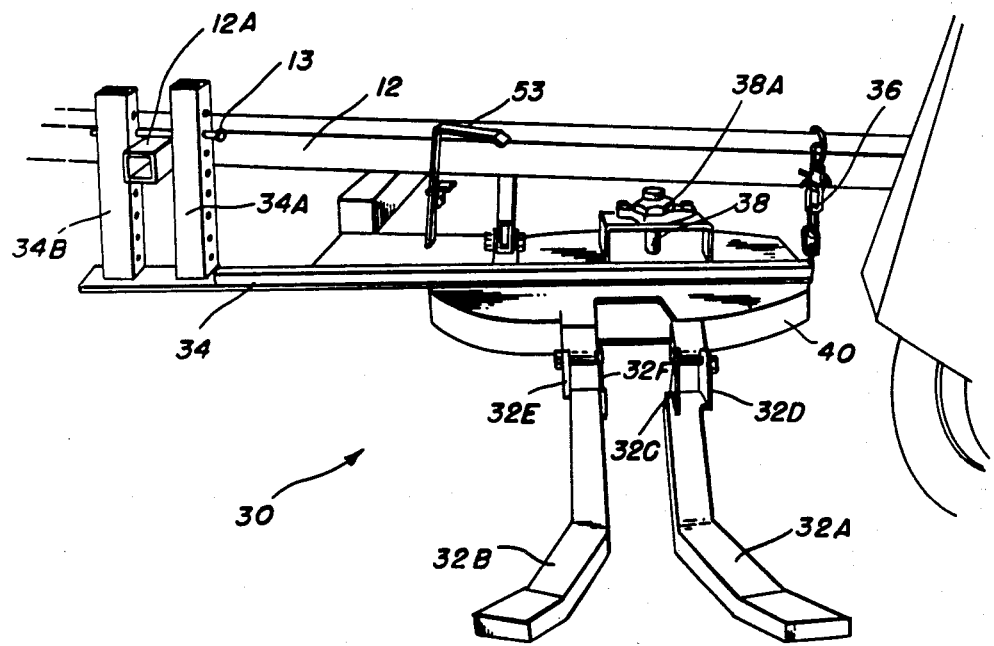
FIG. 2 is a partial front view illustrating the semi-floating, self-steering cutter head according to the present invention.
Figure 3:
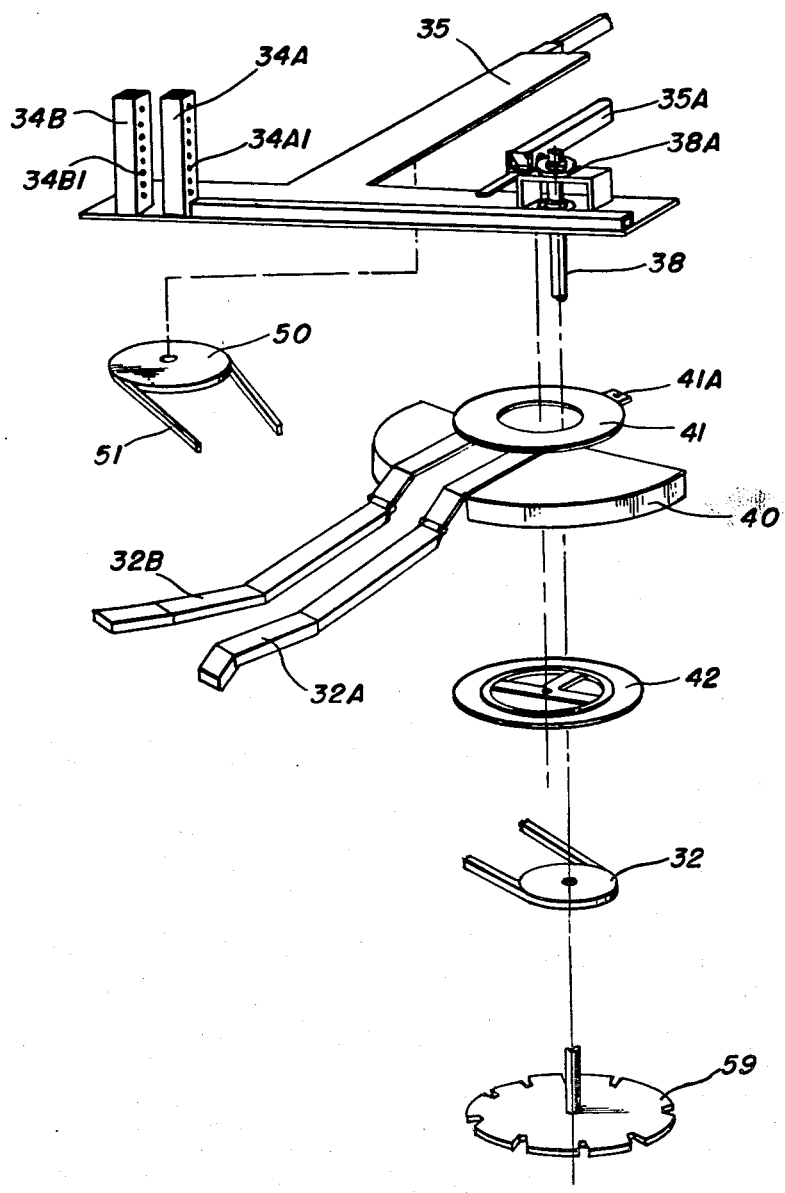
FIG. 3 is an exploded view illustrating the various components of the semi-floating, self-steering cutter head of the present invention.

As illustrated in FIGS. 2 and 3, a self-steering cutter 30 includes a blade shield 40 and outwardly projecting guiding sensors 32A, 32B. The outwardly projecting guiding sensors 32A, 32B are hinged to the blade shield 40 by means of the hinges 32C, 32D and the hinges 32E, 32F, respectively. A cutter head frame 34 is provided with upwardly projecting height adjusted rods 34A, 34B. The height adjusted rods 34A, 34B include a plurality of openings 34A1 and 34B1, respectively, to aid in the adjustment of the cutter head frame 34 relative to the ground surface. In addition, a height adjustment chain 36 is disposed adjacent to the other end of the cutter head frame 34 to aid in the adjustment of the cutter head frame 34. Further, a main support arm 35 and an auxiliary support arm 35A project toward the rear of the self-steering cutter 30. The main support arm 35 and the auxiliary support arm 35A are designed to maintain the attitude and the angle of the self-steering cutter 30 for smooth operation without binding on the stalks of the crops to be harvested.

A top steering plate 41 is provided with a steering output point 41A. The top steering plate 41 is connected to the guidance sensors 32A, 32B and the blade shield 40. Forces transmitted to the guidance sensors 32A, 32B are transmitted to the top steering plate 41 which rotates to permit the steering output point 41A to transmit the forces to the steering linkage 24 thereby effecting steering of the harvesting aid 10.

A bottom steering plate 42 is provided which is concentric with the top steering plate 41. The bottom steering plate 42 is affixed to the cutter head frame 34 to maintain the top steering plate 41 in a fixed plane while permitting the top steering plate 41 to rotate and thereby accomplish steering of the harvesting aid 10.

A driving sheave 50 is rotatably mounted on the lower portion of the main support arm 35. A drive belt 51 is operatively connected to the driving sheave 50 and a driven sheave 52 which is positioned on a saw shaft 38. The saw shaft 38 is rotatably mounted within a saw shaft bearing 38A disposed on the cutter head frame 34. A saw blade 39 is positioned on the lower end of the saw shaft 38. As the driving sheave 50 rotates the drive belt 51, the driven sheave 52 rotates the saw shaft 38 thereby rotating the saw blade 39.

As illustrated in FIG. 2, the support frame 12 includes an outward projection 12A. The height adjustment rods 34A, 34B are spaced relative to each other to permit the projection 12A to extend therebetween. A pin 13 is disposed within openings 34A1, 34B1 in the height adjustment rods 34A, 34B to adjust the height of the cutter head frame 34 relative to the support frame 12 and the projection 12A. Disposed adjacent the central portion of the cutter head frame 34 is a height adjustment lever 53. The height adjustment lever 53 may be actuated by the foot of the operator to raise the self-steering cutter 30 to project a greater distance above the ground surface. A height adjustment chain 36 is disposed adjacent the other end of the cutter head frame 34 to ensure the correct height of the self-steering cutter 30 above the ground surface.

Figure 4:
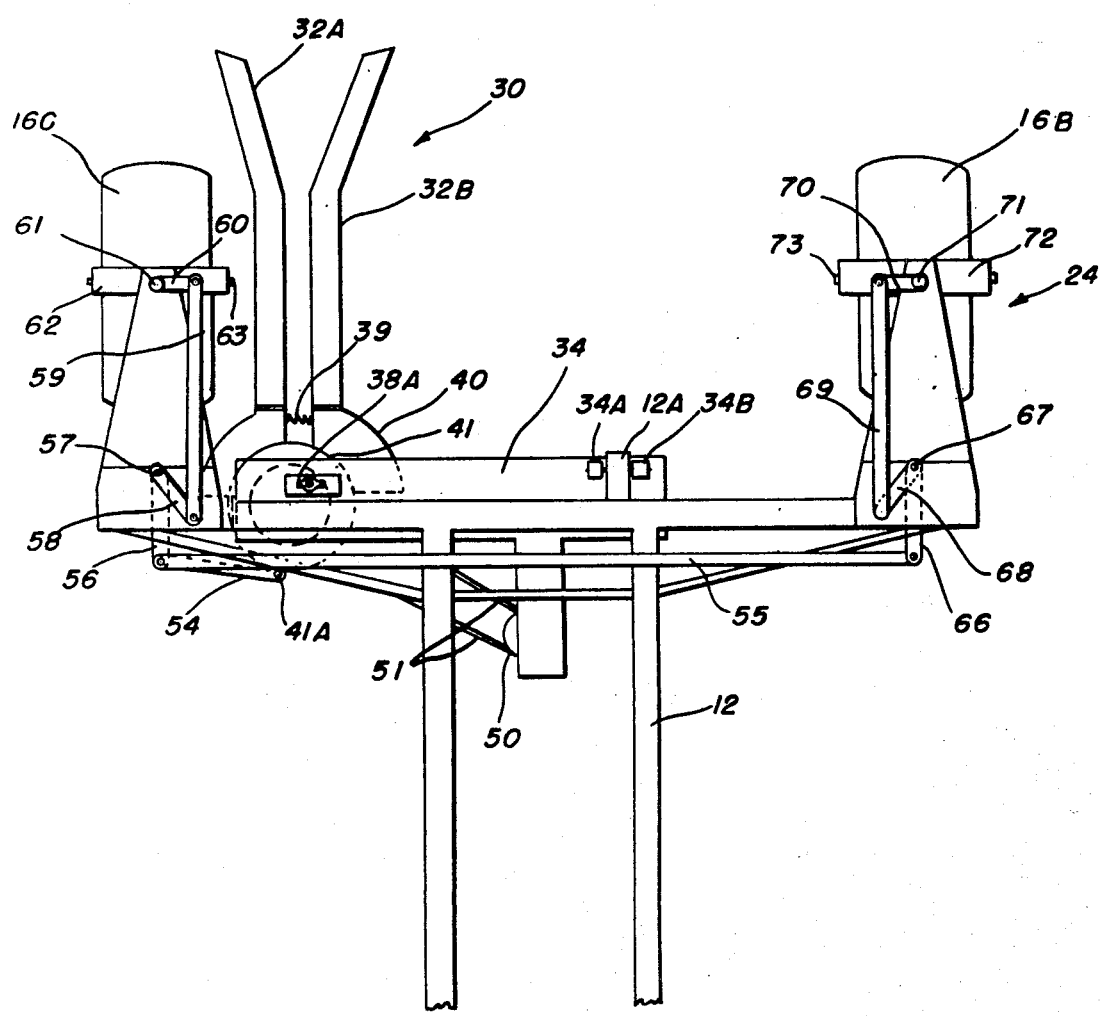
FIG. 4 is a top view illustrating the steering mechanism connected to the self-steering cutter head according to the present invention.

FIG. 4 illustrates a top view of the self-steering cutter 30 showing the interconnection between the output point 41A of the top steering plate 41 to the steering linkage 24. An output point connecting rod 54 connects the output point 41A to the center tie rod 55 and the lower left steering crank arm 56. The lower left steering crank arm 56 is connected through a left pivot shaft 57 to a pivot shaft crank arm 58 and thereafter to a left tie rod 59. The left tie rod 59 is connected through a connecting rod 60 to a shaft 61 which is affixed to an axle support 62. The axle support 62 rotatably positions the axle 63 of the wheel 16C.

The right wheel 16B is connected to the output point 41A in a similar manner. More particularly, the connecting rod 54 is connected to the center tie rod 55 which is connected to the lower right steering crank arm 66. The lower right steering crank arm 66 is connected through a right pivot shaft 67 to a connecting rod 68. The connecting rod 68 is connected to a right tie rod 69 which is connected to a connecting rod 70. The connecting rod 70 is operatively connected to the shaft 71 which is affixed to the axle support 72. The axle support 72 rotatably positions the axle 73 of the wheel 16B. Like numerals in FIG. 4 correspond to like elements as described with reference to FIGS. 1-3.

Figure 5:
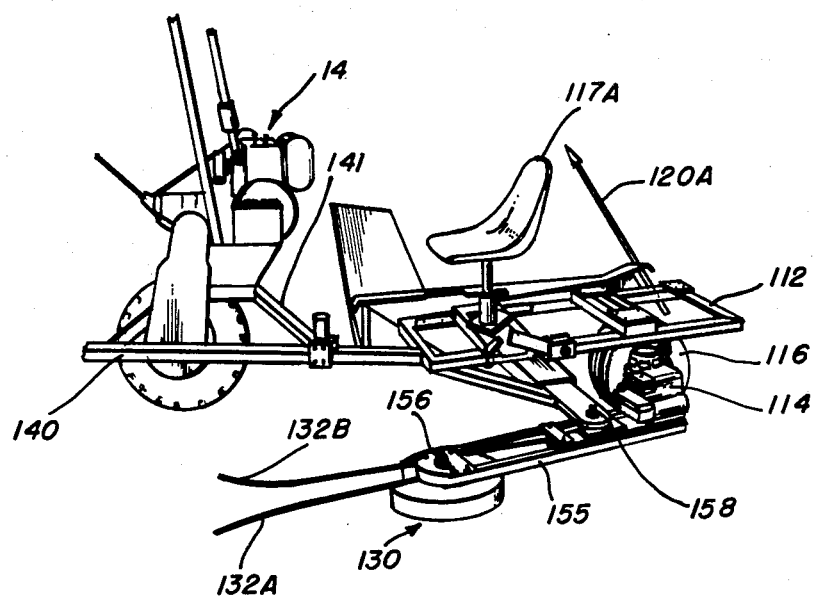
FIG. 5 is a partial perspective view illustrating the auxiliary cutter head attachment of the present invention.
Figure 6:
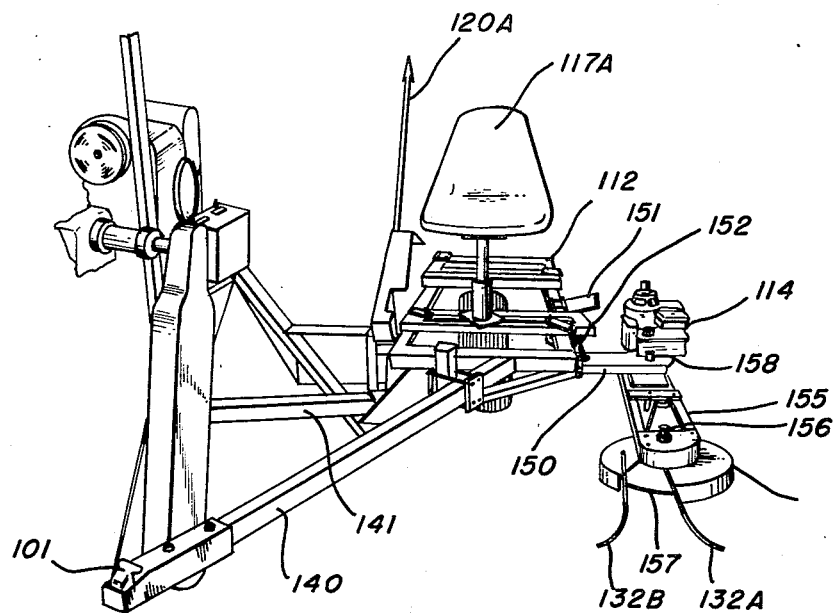
FIG. 6 is a front view illustrating the auxiliary cutter head attachment of the present invention.
Figure 7:
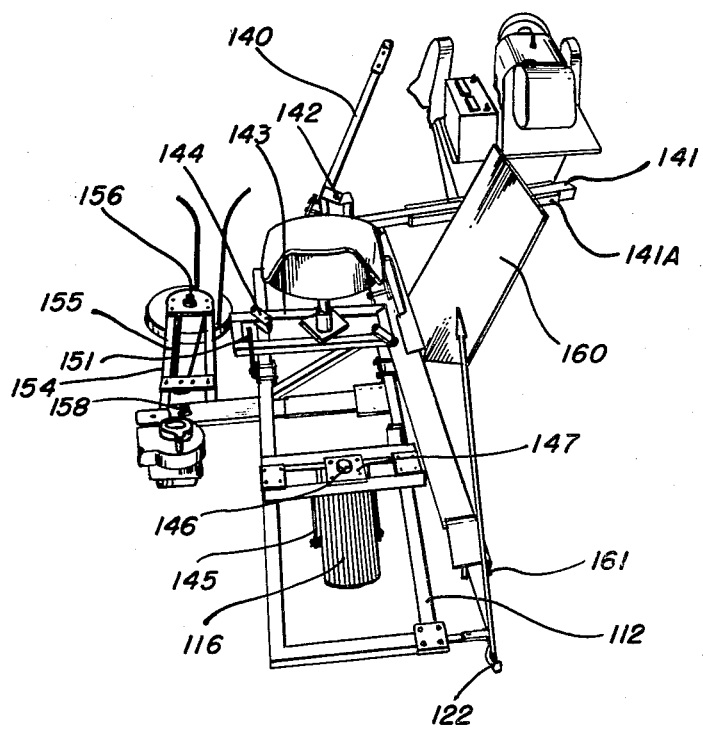
FIG. 7 is a top view illustrating the auxiliary cutter head attachment of the present invention.

Referring to FIGS. 5, 6 and 7, the auxiliary second row attachment 100 is shown in greater detail. The auxiliary support frame 112 is connected to the main support frame 12 by means of the connecting rods 140, 141. The connecting rod 140 is actually affixed to the main support frame 12 by means of a ball and socket connection 101. The connecting rod 141 is affixed to the rear portion of the main support frame 12. As illustrated in FIG. 7, the connecting rod 141 may be slidably received within a U-shaped bracket 141A to vary the lateral displacement of the auxiliary second row attachment 100 relative to the harvester 10. Once the lateral displacement of the auxiliary second row attachment 100 is determined to adjust the positioning of the auxiliary cutter head 130 to align with an adjacent row of crops, then the connecting rod 141 is affixed to the main support frame 12.

The connecting rod 140 and the connecting rod 141 are rotatably affixed relative to each other by means of the pin connection 142. As illustrated in FIGS. 5-7, the pin connection 142 permits the two connecting rods 140, 141 to be rotated relative to each other so as to accurately position the auxiliary second row attachment 100 relative to the harvester 10. The accurate positioning of the two units relative to each other is important so as to ensure that the cutter head 30 and the auxiliary cutter head 130 are properly aligned relative to adjacent rows of crops to be harvested.

The operator's seat 117A is secured on a frame 143 which is affixed to the auxiliary support frame 112 by means of attaching members 144. The attaching members 144 permit limited lateral displacement of the operator's seat 117A relative to the auxiliary support frame 112. The support wheel 116 is mounted on a frame 145 which includes an upwardly projecting shaft 146. The shaft 146 is mounted in a bearing which is affixed to the auxiliary support frame 112 by means of the connector 147.

An adjustable support rod 150 affixes the auxiliary cutter 130 to the auxiliary support frame 112. A lever 151, conveniently positioned relative to the operator's seat 117A, is pivotally mounted to the auxiliary support frame 112. A chain member 152 connects the lever 151 to the adjustable support rod 150. Initially, the adjustable support rod 150 is accurately positioned relative to the auxiliary support frame 112 so as to position the cutter head 130 at a proper spacing relative to the ground surface. Upon encountering an obstacle, the operator may pull upwardly on the lever 151 thereby raising the adjustable support rod 150 and the auxiliary cutter head 130.

The auxiliary motor 114 is mounted on a motor support frame 154. A belt 155 connects an output shaft of the auxiliary motor 114 with the drive shaft 156 of the auxiliary cutter blade 157. The motor support frame 155 is mounted by means of a pin 158 to the adjustable support rod 151. Guidance sensors 132A, 132B are affixed to the housing for the auxiliary cutter head 130. As the sensors encounter obstacles along the row of crops to be harvested, they rotate the motor support frame 155 relative to the adjustable support rod 150. In this manner, the auxiliary cutter blade 157 is accurately positioned relative to the base portion of a row of crops to be harvested.

The stick member 120A is mounted in the stick support 122. The stick support 122 retains the stick 120A in a position whereby the pointed end of the stick is conveniently disposed relative to the operator. As crops are severed by the auxiliary cutter blade 157, an operator would grasp the severed crops and impale the base portion onto the stick 120A. The top portion of the crops would be held by the support frame 160. The support frame 160 is mounted adjacent to the connecting rod 141 so as to hold the top portion of the crop above the ground surface as additional crops are harvested. After a predetermined number of crops are impaled onto the stick 120A, the operator would merely rotate the stick about the bottom portion of the stick support 122 to disengage the stick from the side retaining member 161. Thereafter, the filled stick 120A would fall to the ground surface and a second stick would be inserted into the stick support 122.

In operation, the harvesting aid 10 is initially steered by the operator to be parallel with a primary row of crops with the auxiliary second row attachment 100 being aligned with an adjacent row of crops. Thereafter, the operator may adjust the motor to intermittently advance the harvesting aid 10 and the auxiliary second row attachment 100 along the rows of crops. In an alternative mode of operation, the control rod 18 may be used to intermittently advance the harvesting aid 10 and the auxiliary second row attachment 100 along the rows of crops. The guidance sensors 32A, 32B are initially positioned as as to be disposed on either side of the stock portion of the primary row of crops. As the harvesting aid 10 advances along the primary row of crops, the guidance sensors 32A, 32B transmit forces to the top steering plate 41 which rotates in response to the forces transmitted thereto. Rotating the top steering plate 41 will effect a rotation of the steering output point 41A which transmits the forces to the steering linkage 24 to effect a steering of the harvesting aid 10 and the auxiliary cutter head attachment 100. In addition, the auxiliary guidance sensors 132A, 132B transmit limited forces to the motor support frame 155 to effect a limited rotation of the auxiliary cutter head 130 and the motor support frame 155 relative to the adjustable support rod 150 about the connecting pin 158.

As illustrated in FIG. 4, steering of the harvesting aid 10 is effected in the following manner. After the forces are transmitted from the guidance sensors 32A, 32B to the top steering plate 41, the output point 41A transmits the forces to the connecting rod 54. The connecting rod 54 imparts movement to the lower left steering crank arm 56 and through the center tie rod 55 to the lower right steering crank arm 66. The forces transmitted thereto impart a motion to the connecting rods and tie rods so as to effect movement of the wheels 16C and 16B. More particularly, if a steering correction force is applied to the guidance sensors 32A, 32B which would result in a clockwise rotation of the top steering plate 41, the steering output point 41A would also rotate in a clockwise direction. This clockwise rotation would be transmitted through the lower left steering crank arm 56 and the lower right steering crank arm 66 and through the various tie rods and connecting rods to result in a clockwise rotation of both wheels 16B and 16C. Similarly, if the forces transmitted by the guidance sensors 32A, 32B would tend to rotate the top steering plate 41 in a counterclockwise direction, the various crank arms, connecting rods, and tie rods would impart a counterclockwise rotation to the wheels 16B and 16C.

As the harvesting aid 10 and the auxiliary second row attachment 10 advance along the rows of crops, the stock portions of the crops are severed adjacent the ground level. The severed crops are grasped by the operators positioned on the operators' seats 17A and 117A and are impaled onto the sticks 20A and 120A. After a predetermined number of crops are speared onto the sticks 20A and 120A, the operators rotate the stick upwardly to disengage it from the stick supports 22 and 122 thereby depositing the filled sticks 20A and 120A onto the ground surface for field drying. The operators would then grasp an additional stick 20A and 120A positioned within the stick storage rack 20 and would position it within the stick supports 22 and 122 for subsequent harvesting of severed crops.

The specific height of the self-steering cutter 30 and the attitude may be controlled by the height adjustment rods 34A, 34B, the height adjustment chain 36, the height adjustment lever 53, the main support arm 35 and the auxiliary support arm 35A. The various members which control the height and the attitude may be adjusted very quickly to ensure the proper angle of the self-steering cutter 30 for smooth operation without binding on the stock stumps. In addition, the height adjustment chain 36 permits the self-steering cutter 30 to float upwardly if it strikes the ground, a stone, or other small object. In addition, the driving belt 51 is arranged relative to the driving sheave 50 and the driven sheave 52 to permit the self-steering cutter 30 to move in a vertical direction without effecting the operation of the saw blade 39.

As illustrated in FIGS. 2 and 3, the guidance sensor 32A is mounted on hinges 32C, 32D to the blade shield 40. Similarly, the guidance sensor 32B is mounted on hinges 32E, 32F to the blade shield 40. By mounting the guidance sensors 32A, 32B to the blade shield 40 in this manner, the guidance sensors are permitted to move vertically to compensate for irregularities in the ground surface and to float upwardly if they strike a stone or other small object. When the harvesting aid 10 is not in operation, the guidance sensors 32A, 32B may be pivoted upwardly to engage against the support frame 12 and thereby permit the operator to drive the harvesting aid 10 without the guidance sensors 32A, 32B engaging the ground surface.

The harvesting aid 10 and auxiliary second row attachment 100 according to the present invention are designed to permit operators to harvest a large variety of rows crops and are especially useful in harvesting tobacco crops. The harvesting aid 10 and auxiliary second row attachment 100 are mechanically reliable, relatively simple in construction and are not destructive to the crops.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A harvesting aid for simultaneously harvesting at least two rows of crops comprising:
    a primary support frame mounted on a plurality of ground engaging wheels;
    a primary motor means operatively connected to at least one ground engaging wheel to impel the primary support frame along the ground surface;
    steering linkage means connected to at least one ground engaging wheel to steer the primary support frame along the ground surface;
    a primary self-steering cutter adjustably mounted on the primary support frame and operatively connected to said steering linkage, said primary self-steering cutter including a top steering plate rotatably mounted thereto and a primary cutter blade operatively connected to said primary motor means for severing row crops;
    said primary self-steering cutter including outwardly projecting guidance sensors attached to said top steering plate, said guidance sensors being positioned to engage a row of crops and being mounted for limited vertical movement;
    adjustment means for adjusting said primary self-steering cutter relative to said primary support frame to adjust the height of said self-steering cutter above ground level;
    said primary self-steering cutter and said adjustment means being constructed as an integral unit;
    a primary operator's seat being disposed in close proximity to said primary self-steering cutter to enable a seated operator to conveniently grasp a severed crop for subsequent impaling of the crop onto a harvesting stick;
    an auxiliary row attachment means being operatively connected and being laterally adjustable with respect to said primary support frame;
    an auxiliary cutter head being operatively connected to said auxiliary row attachment means;
    an auxiliary cutter blade for severing row crops being rotatably mounted within said auxiliary cutter head;
    an auxiliary motor means being operatively mounted on said auxiliary row attachment means and being operatively connected to said auxiliary cutter blade;
    an auxiliary operator's seat being disposed in close proximity to said auxiliary cutter head to enable a seated operator to conveniently grasp a severed crop for subsequent impaling of the crop onto a second harvesting stick.

2. A harvesting aid according to claim 1, wherein said adjustment means includes at least one height adjustment rod slidably positioned relative to a projection of said primary support frame and a height adjustment chain adapted to be secured to said primary support frame.

3. A harvesting aid according to claim 2, and further including a cutter head frame on which said primary self-steering cutter, said height adjustment rod and said height adjustment chain are mounted.

4. A harvesting aid according to claim 2, and further including a main support arm and a second support arm for adjusting the attitude of the primary cutter blade.

5. A harvesting aid according to claim 1, wherein said guidance sensors are hinged to said top steering plate to permit vertical movement.

6. A harvesting aid according to claim 1, and further including a cutter head frame for mounting said primary self-steering cutter, a bottom steering plate being affixed to said cutter head frame, said bottom steering plate being mounted in engagement with said top steering plate while permitting rotation of said top steering plate.

7. A harvesting aid according to claim 1, and further including a cutter blade shield being operatively mounted adjacent said top steering plate and said primary cutter blade.

8. A harvesting aid according to claim 1, and further including a driving sheave being operatively connected to said primary motor means, to impart rotation thereto, said driving sheave being operatively connected to a driven sheave affixed to a cutter blade shaft to impart rotation to said primary cutter blade.

9. A harvesting aid according to claim 1, and further including a control rod extending towards said primary operator's seat and operatively connected to said motor means to control the speed and movement of said harvesting aid.

10. A harvesting aid according to claim 1, wherein said top steering plate includes a steering output point operatively connected to said steering linkage means for transmitting forces detected by said guidance sensors to said steering linkage means to effect steering of said harvesting aid.

11. A harvesting aid according to claim 1, and further including a stick support affixed to said primary support frame for positioning said harvesting stick on which severed crops are impaled adjacent to said primary operator's seat.

12. A harvesting aid according to claim 11, and further including a stick storage rack affixed to said primary support frame and being positioned adjacent to said primary operator's seat.

13. A harvesting aid according to claim 1, wherein said auxiliary row attachment means includes an auxiliary support frame mounted on at least one ground engaging wheel.

14. A harvesting aid according to claim 13, wherein said auxiliary support frame is operatively connected to said primary support frame by at least two connecting rods being pivotally mounted with respect to said auxiliary support frame to enable lateral adjustment of said auxiliary support frame relative to said primary support frame.

15. A harvesting aid according to claim 13, wherein said auxiliary motor means is mounted on a motor support frame, said motor support frame being vertically, adjustably mounted with respect to said auxiliary support frame.

16. A harvesting aid according to claim 15, wherein said auxiliary cutter head is operatively mounted on said vertically, adjustably mounted motor support frame to adjust the height of the auxiliary cutter head above ground level.

17. A harvesting aid according to claim 16, and further including a lever operatively mounted on said auxiliary support frame in close proximity to said auxiliary operator's seat and connected to said motor support frame for manually raising said motor support frame relative to said auxiliary support frame.

18. A harvesting aid according to claim 1, and further including a drive sheave operatively connected to said auxiliary motor means, a belt and a driven sheave operatively connected to a shaft affixed to said auxiliary cutter blade for imparting rotation from said auxiliary motor means to said auxiliary cutter blade.

19. A harvesting aid according to claim 1, and further including a stick support affixed to said auxiliary support frame for positioning said second harvesting stick adjacent to said auxiliary operator's seat.

20. A harvesting aid according to claim 15, and further including an adjustable support rod operatively connected to said auxiliary support frame and said motor support frame, said motor support frame being rotatably mounted with respect to said adjustable support rod.

21. A harvesting aid according to claim 20, and further including auxiliary guidance sensors projecting outwardly from said auxiliary cutter head for rotating said auxiliary cutter head about said adjustable support rod as said auxiliary guidance sensors engage a row of crops.

* * * * *